(No Model.)
C. E. PERRY.
PRUNING SHEARS.
No. 576,688. Patented Feb. 9, 1897.
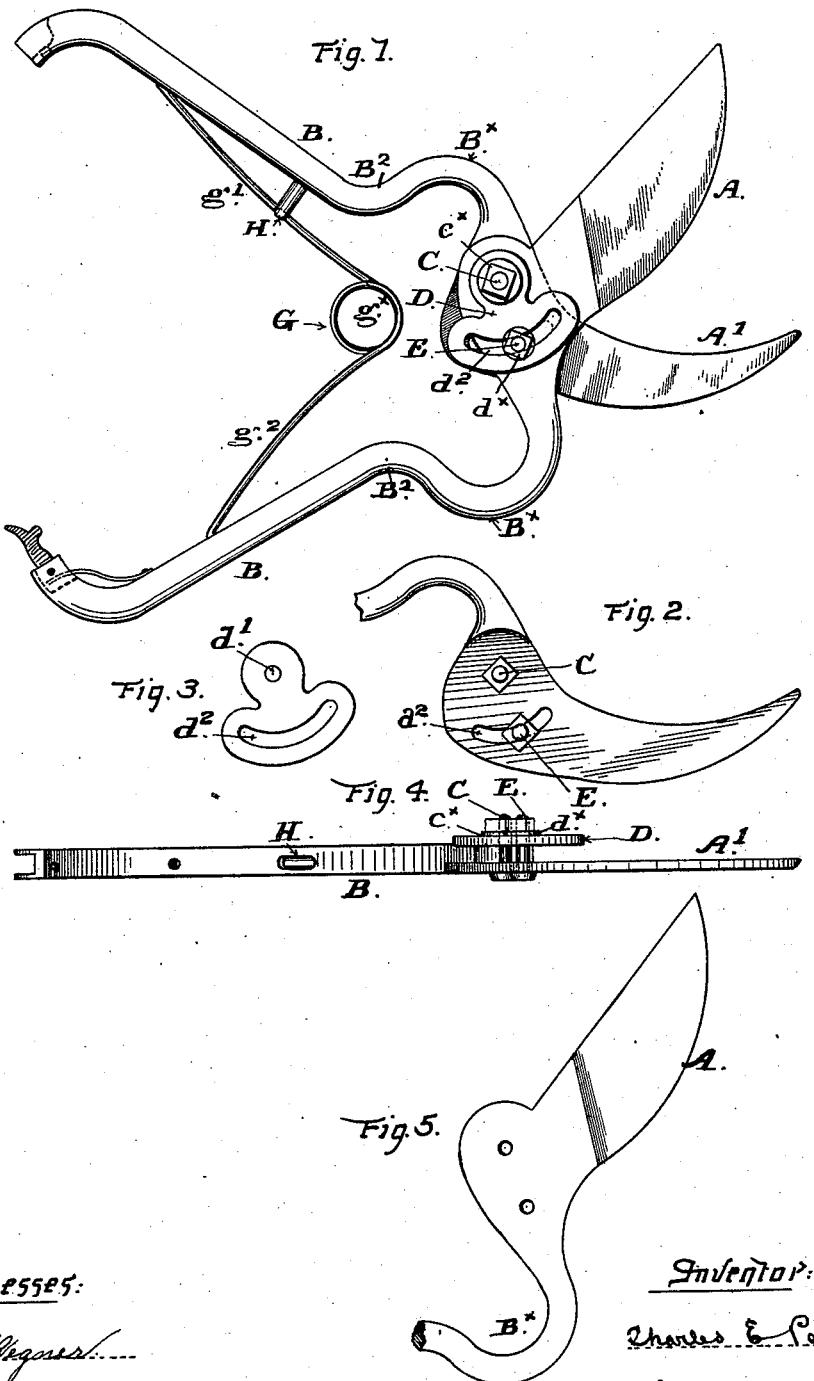

UNITED STATES PATENT OFFICE.

CHARLES E. PERRY, OF SAN FRANCISCO, CALIFORNIA, ASSIGNOR TO JOHN KLEINER, OF OAKLAND, CALIFORNIA.

PRUNING-SHEARS.

SPECIFICATION forming part of Letters Patent No. 576,688, dated February 9, 1897.

Application filed October 10, 1895. Serial No. 565,275. (No model.)

*To all whom it may concern:*

Be it known that I, CHARLES E. PERRY, a citizen of the United States, residing in the city and county of San Francisco and State of California, have invented certain new and useful Improvements in Pruning-Shears, of which the following is a specification.

This invention has for its object, mainly, to prevent or overcome the spring or lateral movement of the cutting blades or jaws in pruning-shears under the strain of heavy work, such as in cutting thick branches and limbs in pruning operations, and to provide for taking up loose movement of the parts upon each other resulting from wear.

To such end the invention consists in the described construction, combination, and arrangement of parts producing an improved means for stiffening the joint in a pair of pruning-shears or similar implement.

The following description explains the manner in which I construct, apply, and carry out my said improvement, reference being had to the drawings accompanying and forming part of this specification.

Figure 1 of the said drawings represents a pair of pruning-shears with my improvement applied to the joint; Fig. 2, a top view in detail of the hooked jaw; Fig. 3, a top view of the slotted plate removed from the joint; Fig. 4, an edge view of the jaw, Fig. 2, and its handle with the pivot-bolt and the slotted plate in place, the cutting-blade or other jaw of the implement being removed. Fig. 5 is a plan view of the cutting-blade.

A indicates the cutting-blade, A' the hook-shaped jaw that works against it, and B B the handles.

C is the bolt uniting these two parts and forming the pivot on which they work.

D is a plate provided with a hole $d'$ for the pivot-bolt C and having a curved slot $d^2$ concentric with the bolt-hole $d'$ and located on one side of the center thereof.

E is a bolt that is set through the curved slot in the plate and through a hole in the blade A beneath the plate, it being noticed that the said plate is laid directly against and flat upon the shank of the blade A at the pivot. The bolt E when inserted in place through the hole in the blade A and into the slot in the plate D is passed from the under side through a curved slot $a^2$ in the shank of the jaw A' with the head of the bolt resting upon the metal around the slot, while the threaded end of the bolt takes the nut and washer $d^\times$ by which the two parts, the jaw A and the plate D, are drawn toward each other. Between these two parts the shank of the blade A is thus confined and is clamped between them by tightening the bolt E. The slot $a^2$ is made concentric with the pivot C, so that while the bolt E is fixed in the blade A it is free to slide in the slot of the jaw A', as well as in the plate D, when the jaw and plate turn on the pivot C. As the two slots are concentric with the pivot the bolt E slides smoothly in them when the jaws are opened or closed. The pivot-bolt is drawn up and tightened by the nut $C^\times$, that is screwed down after the plate D is placed over the end of the bolt C, a washer being placed under the nut. As thus constructed and applied it will be seen that the plate D is held closely against the shank of the blade A at the pivot C by being placed under the nut $C^\times$, and is also stiffly connected to the jaw against which the blades work at a point beyond the pivot by the bolt E, in consequence of which the joint is strengthened and stiffened to such a degree that lateral spread or springing movement of the jaws is prevented and the cutting edges are kept in close working position.

Loose movement of the jaws resulting from wear is readily taken up also from time to time by tightening the nuts on the two bolts.

Having thus fully described my invention, what I claim therein as new, and desire to secure by Letters Patent, is—

In a pruning-shears or similar cutting implement, the combination, with the cutting-jaws united by a pivot-bolt; of the plate D having a hole for the pivot-bolt on which it is placed beneath the nut of said bolt, and having a curved slot concentric with such bolt-hole and located to one side thereof, and a bolt which is inserted through said curved slot of the plate and through the shanks of the two blades or jaws beneath, the undermost jaw having a slot of corresponding curvature to that in the said plate for the bolt E to slide in and the blade next to the said plate having a hole for said bolt, and nuts on said bolts for securing the parts together combined for operation as described.

In testimony that I claim the foregoing I have hereunto set my hand and seal.

CHARLES E. PERRY. [L. S.]

Witnesses:
CHAS. E. KELLY,
M. REGNER.